United States Patent [19]

Brockmeier et al.

[11] Patent Number: 4,697,404
[45] Date of Patent: Oct. 6, 1987

[54] TRACTOR MOWER SYSTEM

[75] Inventors: Kenneth R. Brockmeier; Arthur E. Brockmeier, both of Edwardsville, Ill.

[73] Assignee: Brockmeier Sod Farms, Edwardsville, Ill.

[21] Appl. No.: 782,582

[22] Filed: Oct. 1, 1985

[51] Int. Cl.$^4$ .................. A01D 75/30; A01D 55/264; A01D 55/30

[52] U.S. Cl. ........................................ 56/6; 56/10.9; 56/11.9; 56/15.2; 56/228; 172/308; 172/456

[58] Field of Search .................. 56/6, 7, 10.8, 10.9, 56/11.9, 13.6, 15.2, 17.5, 503, DIG. 10, 228; 172/301, 308, 311, 456; 47/1.5; 111/77, 72, 52

[56] References Cited

U.S. PATENT DOCUMENTS

| | | | |
|---|---|---|---|
| 2,743,567 | 5/1956 | Martin | 56/6 |
| 2,920,434 | 1/1960 | Ingram | 56/13.6 |
| 3,135,079 | 6/1964 | Dunn | 56/13.6 |
| 3,500,619 | 3/1970 | Bacon | 56/6 |
| 3,729,910 | 5/1973 | Hardee | 56/11.9 |
| 3,854,271 | 12/1974 | Aldred | 56/10.9 |
| 3,918,240 | 11/1975 | Haffner et al. | 56/7 |
| 4,308,713 | 1/1982 | James | 56/11.9 |
| 4,336,846 | 6/1982 | Boetto | 172/311 |
| 4,384,444 | 5/1983 | Rossler | 56/13.6 |
| 4,442,658 | 4/1984 | Cartner | 56/6 |

FOREIGN PATENT DOCUMENTS

3327568  2/1985  Fed. Rep. of Germany ........ 111/52

Primary Examiner—Robert P. Swiatek
Assistant Examiner—John G. Weiss
Attorney, Agent, or Firm—Rogers, Howell, Moore & Haferkamp

[57] ABSTRACT

A tractor mower system comprising a mower attachment and an oil reservoir and power assembly. The mower attachment has a tool bar from which a plurality of mower units are suspended. The tool bar is connectable to a three-point hitch at the front end of the tractor. Hydraulic conduit means leading from the tractor to the motors that rotate the mowers have quick disconnect couplings. The mower units are staggered with their ends overlapping to avoid unmowed paths between them. Each mower unit has a plurality of rotary blades. The hydraulic reservoir and power assembly is connected to a three-point hitch at the back of the tractor. Fluid is pumped from the reservoir to the motors of the mower units and back to the reservoir through conduits. These conduits are also connected by quick disconnect couplings. The outboard portions of the tool bar support outboard mower units and are pivotal relative to the inboard section. Dump valves allow selective circulation of the hydraulic fluid to selectively bypass the outboard mower motors to stop their operation when they are pivoted upwardly.

8 Claims, 25 Drawing Figures

TRACTOR MOWER SYSTEM

BACKGROUND OF THE INVENTION

1. Field of the invention

This invention relates to a tractor mower system and particularly to a large grass rotary mower attachment and a hydraulic reservoir and power attachment for a farm tractor that can be connected to or released from the tractor in a very short period of time.

2. Description of Related Art

Stuchl, U.S. Pat. No. 4,304,086 dated Dec. 8, 1981 discloses a mowing attachment for tractors. However, the mowing attachment is intended for small garden size tractors. The mower in the Stuchl patent does not have the kinds of controls that are present in the mower accessory of this invention.

U.S. Pat. No. 3,034,274 to Webb, dated May 15, 1962 discloses multiple bar mowers attached to a tractor. The mowers can be raised and lowered and they can be detached from the tractor. However, the Webb patent does not disclose a large mower accessory with the features of the present invention.

Goodwin U.S. Pat. No. 2,724,227 dated Nov. 22, 1955 discloses a mechanism for elevating mowers. The Goodwin patent discloses a typical gang-mower arrangement of mowers mounted at the midsection of a tractor rather than in front of the tractor as in the present invention.

Mullet et al U.S. Pat. No. 4,497,160 discloses rotary mowers, but they are not mounted in front of the tractor as disclosed in the present invention so that all mower units can be observed by the operator of the tractor.

The Van der Lely U.S. Pat. No. 3,717,981 discloses mowers that can be pivoted upwardly, but these mowers are not shown attached to the front end of a tractor.

Bacon U.S. Pat. No. 3,500,619 discloses a particular kind of mowing unit but otherwise not like the one of the present invention.

SUMMARY OF THE INVENTION

The tractor mower system of this invention meets the needs of those having large mowing projects, such as those of a sod farmer. To the sod farmer, time spend in mowing is necessary, but represents valuable time taken from other jobs. Yet regular mowing is extremely important for known reasons, one being that regular mowing kills weeds and eliminates much of the need for weed killer. Of course, mowing is necessary to keep the sod under control. To maximize mowing efficiency, a large mower is desirable. Rotary mower units are also desirable. A major problem is the large amount of power needed to meet these requirements. Typical integrated self-powered mowers with such power would be very expensive and would be single-purpose. This invention provides a mower attachment that can be quickly connected to a conventional all-purpose tractor.

This tractor mower system comprises a mower attachment having a plurality of mower units, such as four, all attached to the front of a tractor. The mower units preferably have rotary blades rather than being of the reel type, and preferably each mower unit has three rotary blades. There is a tool bar supported across the front of the tractor by a structure including a standard tractor three-point hitch. The mower units are hung from the tool bar. The tool bar is controlled by the hydraulic system of the tractor to raise and lower all the mower units together. In addition, the tool bar has outboard sections that are pivotally connected to a central inboard section. The outboard sections are controlled by the hydraulic system of the tractor to be selectively pivotable to swing the mower units attached to them upwardly for various purposes. These purposes include reduction of the width of the overall assembly as may be necessary to drive the tractor on a road, and pivoting a mower unit to an angle for mowing the side of a hill. When all the mower units are in their lowered positions, they are free-floating on wheels so that they can mow evenly in spite of undulations of the ground. Each outboard mower unit can be raised independently of the other so that either outboard mower unit can be used to mow the side of a hill. Also, raising one or both the outboard mower units, while continuing to operate those units that remain lowered, allows mowing within a narrower than normal confine such as between trees.

A large oil reservoir and power attachment, preferably 200 gallons in capacity, is mounted on the back of the tractor by a three-point hitch. Oil pumps are associated with the oil reservoir to distribute oil from the reservoir through appropriate piping to the mower motors and back to the reservoir. This oil both operates the motors and keeps them cool. Notably, since the reservoir is mounted at the back of the tractor, it is not in front of the tractor radiator where it would tend to choke out the engine of the tractor. Special valves allow the operator to selectively bypass the outboard mower motors, which is particularly desirable when those mower units are elevated and not in use.

This mower attachment can be released from a tractor in a very short time, allowing the tractor to be used for farm jobs other than mowing purposes. The release time is less than twenty minutes, covering release of both the rear mounted oil reservoir and power assembly and the front mounted mower attachment. There are special disconnect couplings in the hydraulic hoses to allow this quick release of the equipment. These quick disconnect couplings have valves that automatically close upon disconnecting the coupling and automatically open upon reconnecting the couplings.

Other factors have been incorporated to make this tractor mower system economical to construct and long-lasting, including gear ratios between the tractor power takeoff and the oil pumps that maximize efficiency of the pumps, and flow dividers that allow each pump to drive two mower motors at even speeds regardless of variations in their resistances.

This very large rotary mower attachment can mow a path as wide as 24 feet. All the mowers are in front of the tractor so the operator can easily view them while looking forward as he operates the tractor. This allows the operator to see the entire mowing operation as well as obstacles that the tractor might be approaching. The wide mower assembly also allows the tractor to be steered around a tight corner or obstacle, because the lateral extremes of the mower attachment are spaced as much as about six feet from the front wheels of the tractor. Also, because of the weight of the mower attachment, use of the turning brakes is minimized, thereby avoiding digging of the sod still further. The heavy weight of the front-mounted mower attachment facilitates the use of wide turf-tread tires on the front wheels of the tractor without sacrifice of steering control, further protecting the sod as well as improving the ride quality of the tractor.

An important advantage of the present invention is that it allows the use of a multiple purpose farm tractor. Typically such a tractor has a hitch that can be attached to various attachments. Unlike integral or unitary powered mowers that can be used for only one purpose, this invention allows the tractor to be used for other farm purposes with very little loss of time. In addition, the conventional tractor has an enclosed cab which is a significant advantage to an operator during a mowing operation. For example, the endlosed cab can be air conditioned, filtered, or otherwise environment-conditioned. This keeps dust and other kinds of foreign matter out of the lungs of the operator. Another feature of the invention is that, by allowing the use of a conventional tractor, the tractor selected can have front-wheel steering. Many mowers employ rear-wheel steering which is much less responsive to turning requirements than front wheel steering.

Still another advantage of the invention is that it allows the mower attachment to be used with a tractor that has a two speed power takeoff with the higher speed, preferably about 1,000 RPM, accomplishing an adequate speed to get the needed flow from the oil pumps.

DETAILED DESCRIPTION OF THE INVENTION

Figure 1:
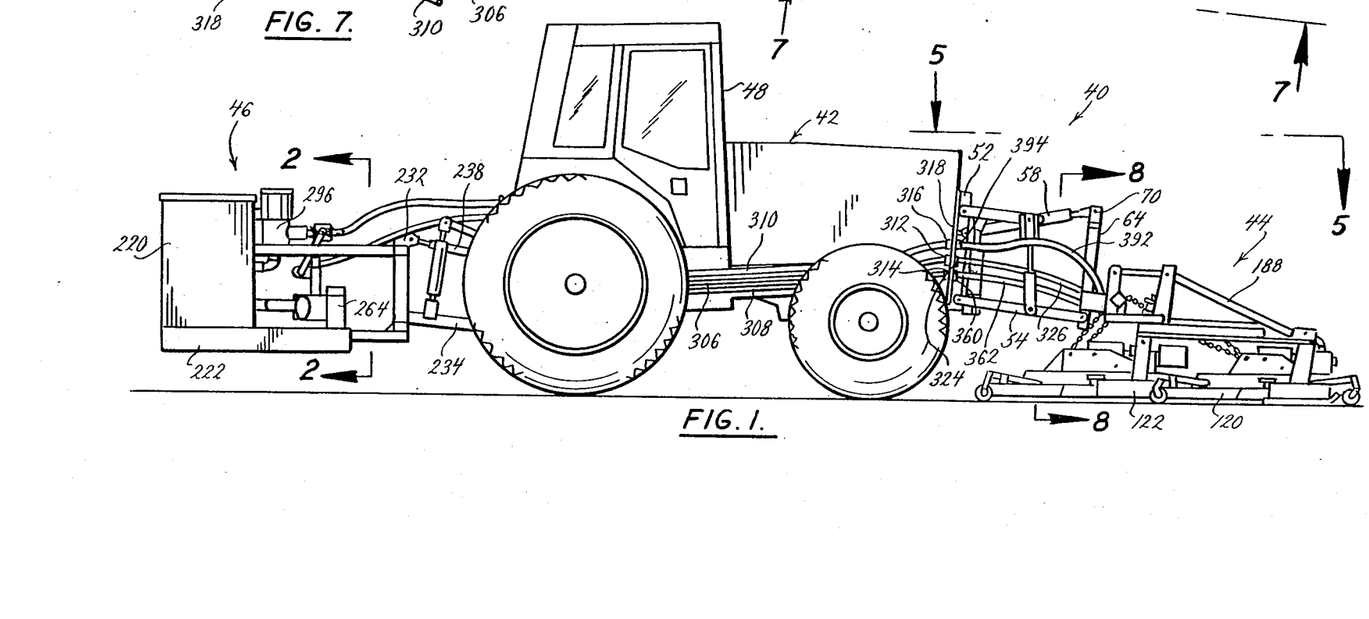
FIG. 1 is a side elevation view of the tractor mower system illustrating the mower attachment including the mower attachment assembly and the oil reservoir and power assembly attached to the front and rear, respectively, of a conventional tractor.

FIG. 1 illustrates the tractor mower system 40 consisting of a mower attachment assembly 44 connected to the front of the tractor and a hydraulic reservoir and power assembly 46 connected to the rear of the tractor. It is notable that the tractor 42 has an enclosed cab 48 that can be atmosphere conditioned and filtered for protection against dust and foreign matter in the air. Preferably the tractor has a dual speed power takeoff with a high speed of 1,000 RPM and a low speed of about 540 RPM. It is also desirable that the air intake of the tractor 42 be other than at the front of the tractor so that dust flying from the operation of the mower assembly 44 will not be in the direct area of the cooling air intake. Also, it is preferable that the tractor 42 have four-wheel drive or front-wheel drive and be provided with oversized turf-tread front tires. The horsepower of the tractor 42 may be selected by the operator. Preferably it is about 110 horsepower. It will now be apparent that a general purpose farm tractor can be used with this invention, which is significant in that it allows custom selection of the tractor 42 independently of the mower attachment assembly 40 and it also permits the selection of a the tractor 42 than can be used for other farm purposes.

For this invention, it is preferable that the tractor 42 be provided with a conventional three-point hitch at its front and rear. At the front 50 of the tractor 42, the hitch includes a frame 52 affixed to the tractor. Two lower arms 54 and 56 are pivotally connected to the frame 52, and between and above the lower arms 54 and 56, a central arm 58 is also pivotally connected to the frame 52. As is further conventional, a turnbuckle linkage 60 is pivotally connected between each lower arm 54 and 56 and the frame 52. A pair of hydraulic cylinders 62 operating between the frame 52 and the turnbuckle linkages 60, as controlled from the tractor cab 48, cause the lower arms 54 and 56 to be raised and lowered, and with them the upper arm 58 when it is attached to an implement.

The mower attachment assembly 44 includes a support frame 64. The three hitch arms 54, 56 and 58 can be connected to the support frame 64 by removable pins 66, 68 and 70, as is known in the art.

Figure 6:
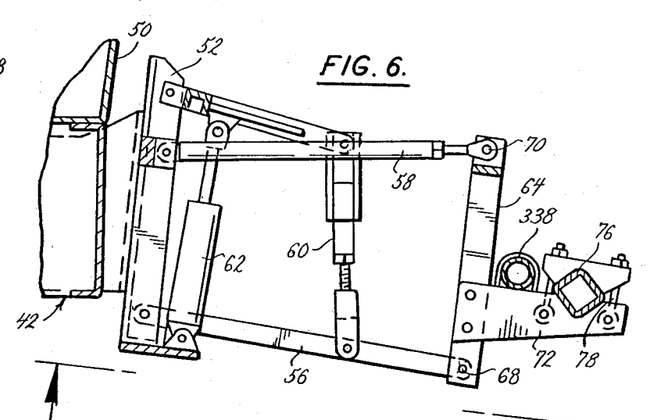
FIG. 6 is an enlarged partial side elevation view in longitudinal medial section particularly showing the front hitch portion of the mower assembly attachment.
Figure 8:
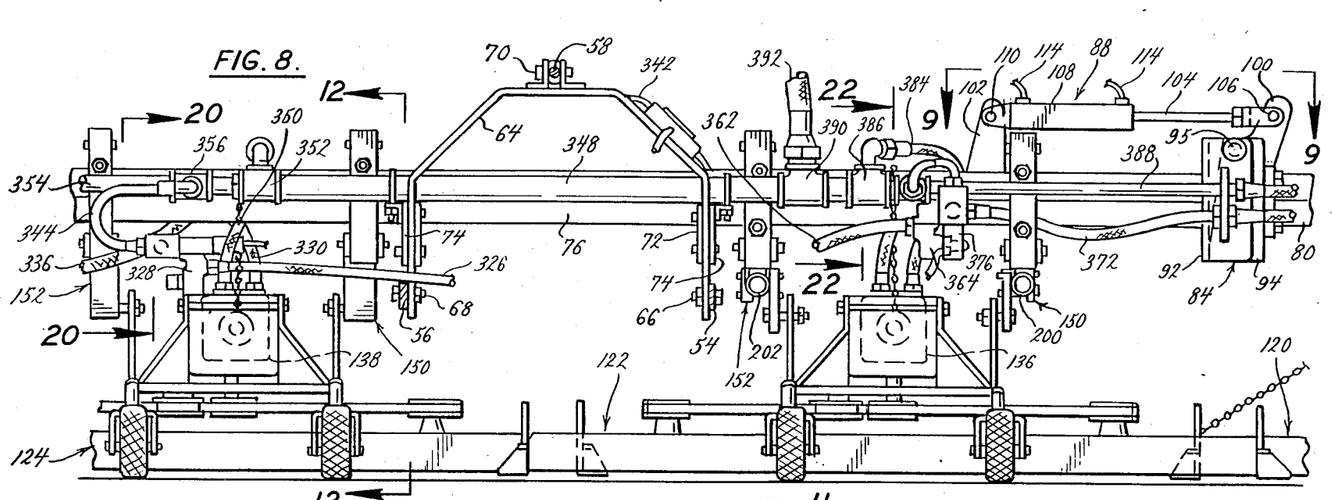
FIG. 8 is an enlarged rear elevation view of the central portion of the mower attachment assembly generally as viewed along the plane of the line 8—8 of FIG. 1.
Figure 9:
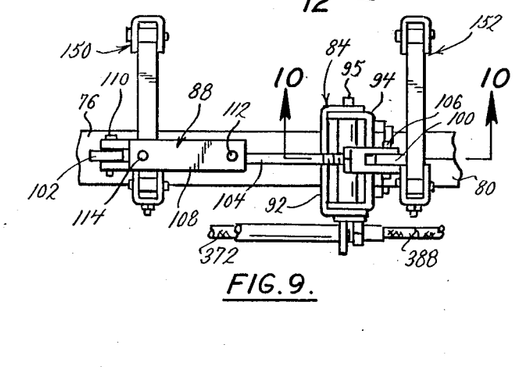
FIG. 9 is a plan view of that portion of FIG. 8 indicated by the plane of line 9—9 of FIG. 8.

As shown in FIGS. 6 and 8, the support frame 64 includes laterally spaced, forwardly extending plates 72 and 74 to which a tool bar central section 76 is connected by U-bolts 78. Tool bar outboard sections 80 and 82 are connected to the tool bar central section 76 at pivot joints 84 and 86. A hydraulic piston and cylinder assembly 88 is connected between the tool bar central section 76 and the outboard section 80, and another hydraulic piston and cylinder assembly 90 is connected between the tool bar central section 76 and the tool bar outboard section 82. The piston and cylinder assemblies 88 and 90 are operated to swing the outboard tool bar outboard sections 80 and 82 upwardly between horizontal and vertical positions, as will appear.

Figure 10:
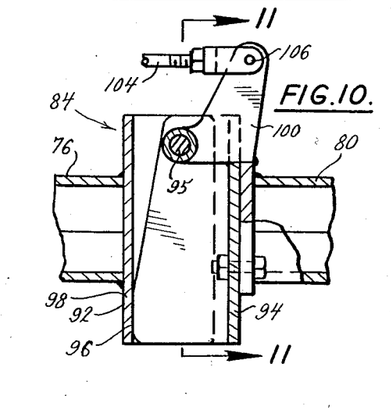
FIG. 10 is a further enlarged view in section taken along the plane of the line 10—10 of FIG. 9.
Figure 11:
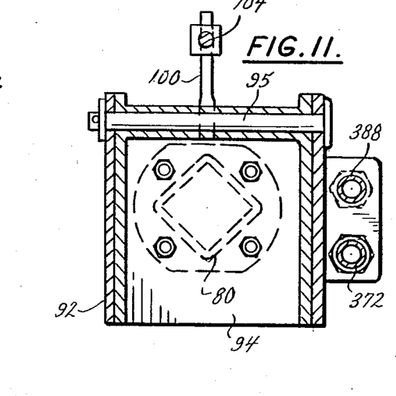
FIG. 11 is a view in section taken along the plane of the line 11—11 of FIG. 10.

The pivot connection 84 and the hydraulic piston and cylinder assembly 88 for the outboard tool bar section 80 are particularly shown in FIGS. 8, 9, 10 and 11, and it will be apparent that on the other side of the mower assembly 44, the pivot connection 86 and the hydraulic piston and cylinder assembly 90 are essentially identical and opposite. The pivot connection 84 includes a U-shaped bracket 92 welded to the end of the central tool bar central section 76 and another U-shaped bracket 94 welded to the end of the outboard tool bar section 80. The bracket 94 fits within the bracket 92 and they are pivotally connected together by a suitable pin 96. As shown in FIG. 10, the bracket 94 has edges 96 that engage a wall 98 of the bracket 92 to limit the downward swing of the outboard tool section 80 to a horizontal position.

Figure 18:
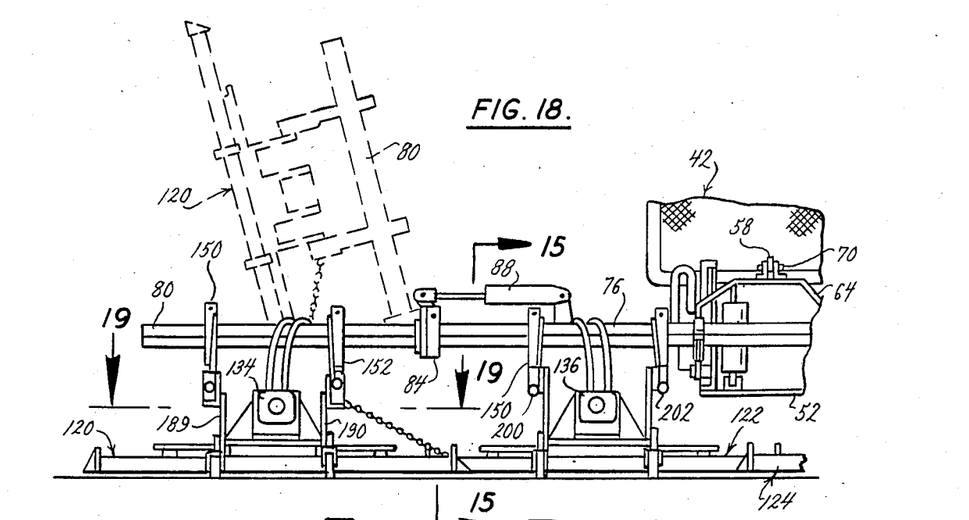
FIG. 18 is a front elevation view of the left side of the mower attachment showing an outboard section in dotted lines in an elevated condition.
Figure 19:
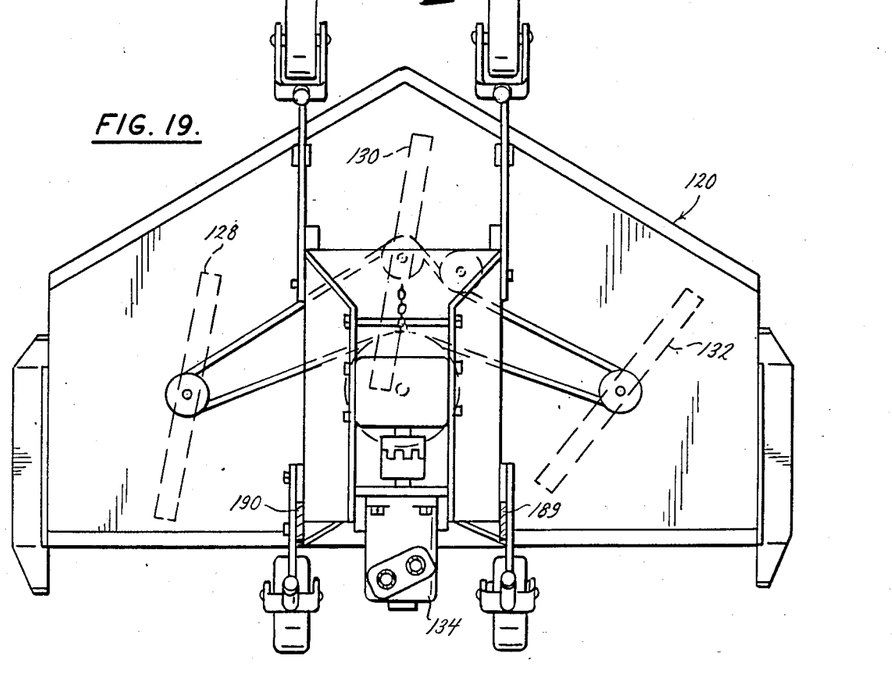
FIG. 19 is an enlarged top plan view of a mower such as viewed along the plane of the line 19—19 of FIG. 18.
Figures 20, 21, 22, 23:
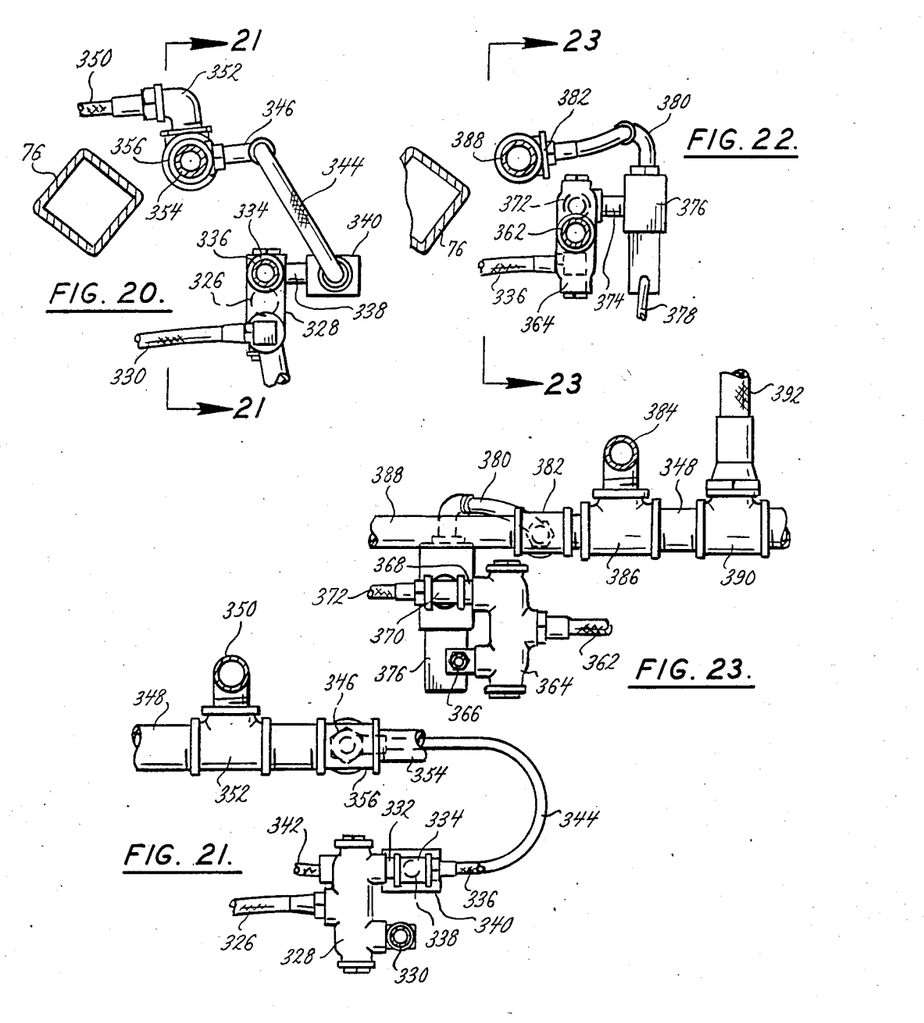
FIG. 20 is a view in section on an enlarged scale viewed along the plane of the line 20—20 of FIG. 8.
FIG. 21 is a further enlarged view in section taken along the plane of the line 21—21 of FIG. 20.
FIG. 22 is an enlarged view in section viewed along the plane of the line 22—22 of FIG. 8.
FIG. 23 is a further enlarged view in section viewed along the plane 23—23 of FIG. 22.

A lug 100 extends upwardly from the bracket 94. Another lug 102 extends upwardly from the tool bar central section 76. The end of a piston rod 104 is connected by a pivot pin 106 to the lug 100 and the end of the cylinder 108 is connected by a pivot pin 110 to the lug 102. The cylinder 108 has hydraulic fluid lines 112 and 114 leading to it that allow it to be actuated from the tractor cab 48 to extend and withdraw the piston 104, thereby swinging the tool bar outboard section 80 between the horizontal position and the generally vertical position illustrated in dotted lines in FIG. 18.

The mower attachment assembly 44 includes a plurality of mower units. Although there may be more or fewer mower units, the preferred embodiment, as illustrated, comprises four mower units 120, 122, 124 and 126 with two of the units 122 and 124 connected to the tool bar central section 76, one of the units 120 connected to the right tool bar output section 80, and the other mower unit 126 connected to the left tool bar outboard section 82.

Figure 5:
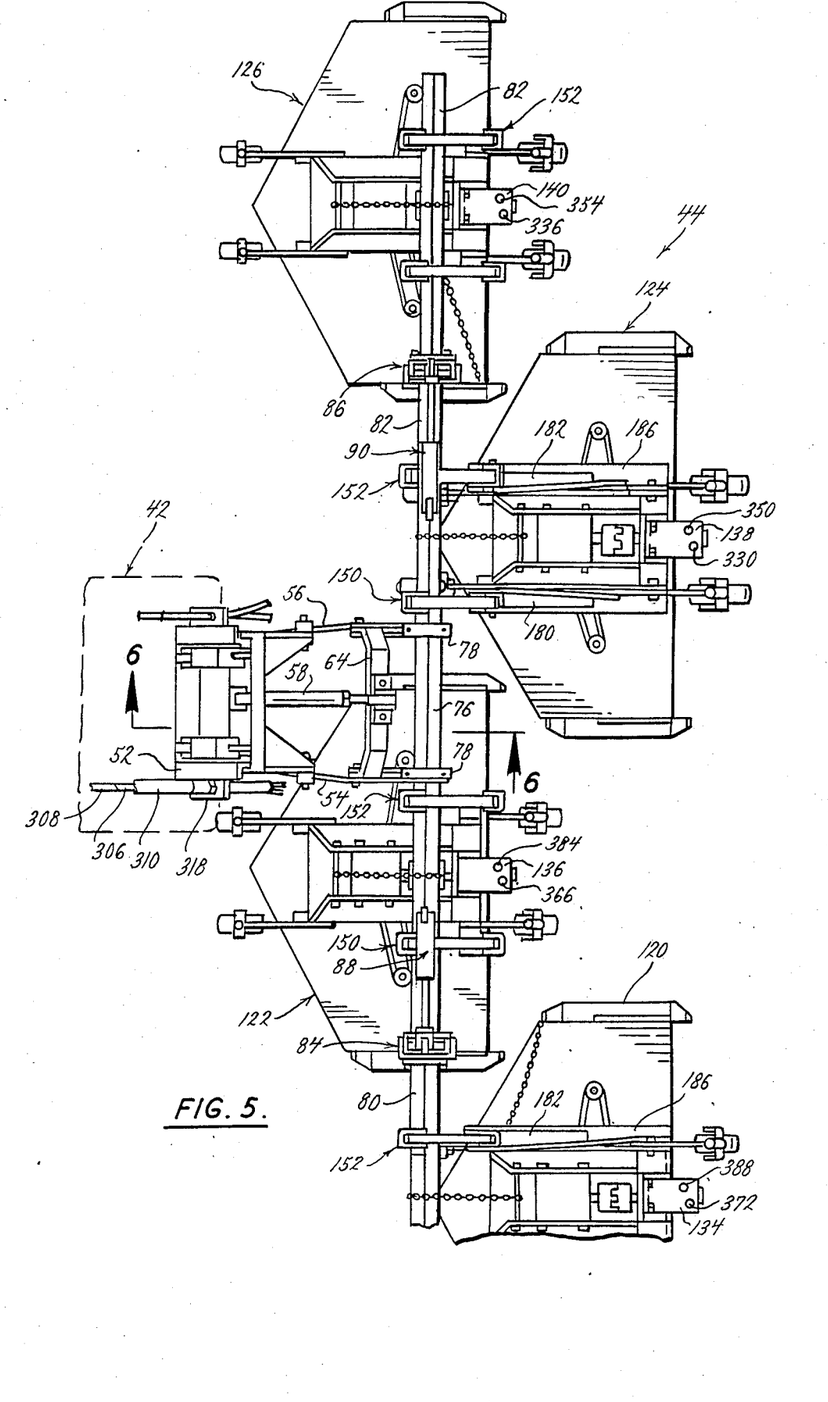
FIG. 5 is a top plan view of the mower attachment assembly and the hitch to the tractor generally as viewed along the plane of the line 5—5 of FIG. 1.

As shown particularly in FIG. 5, the mower units 120, 122, 124 and 126 are alternately staggered forwardly and rearwardly, primarily so their ends can overlap to prevent unmowed rows between them. Preferably, each mower unit 120, 122, 124 and 126 has three blades 128, 130 and 132 which combine to mow about a six-foot wide path. The blades of the mower unit 120 are rotated through a conventional drive connector, such as belts and a clutch, by a hydraulic motor 134. The mower unit 122 is operated by a similar hydraulic motor 136. Likewise, the mower unit 124 is operated by a hydraulic motor 138, and the mower unit 126 is operated by a hydraulic motor 140. The hydraulic source and fluid conduits for these motors will be described hereinafter.

As has been metioned, the mower units 120, 122, 124 and 126 overlap one another to avoid unmowed rows. To this end, the mowers are staggered with alternate ones 120 and 124 forward of the other mower units 122 and 126.

The means of mounting the mower units 120, 122, 124 and 126 to the tool bar sections will now be described. There are two parallelogram brackets 150 and 152 associated with each mower unit. As particularly shown in FIGS. 12 and 156, each parallelogram bracket assembly 150 and 152 comprises a vertical channel member 154 fastened by a U-bolt 156 to the appropriate tool bar section 76, 80 or 82. A pair of plates 158 and 160 are pivotally mounted by a pin or bolt 162 to the channel member 154 and extend forwardly thereof. Above the plates 158 and 160 a rod 164 is pivotally mounted to the channel member by a pin or bolt 166. At their forward ends, the plates 158 and 160 are pivotally mounted to another channel member 168 by a pin or bolt 170. Likewise, at its forward end, the rod 164 is pivotally mounted to the channel member 168 by a pin or bolt 172.

Figures 13, 14, 15, 16, 17:
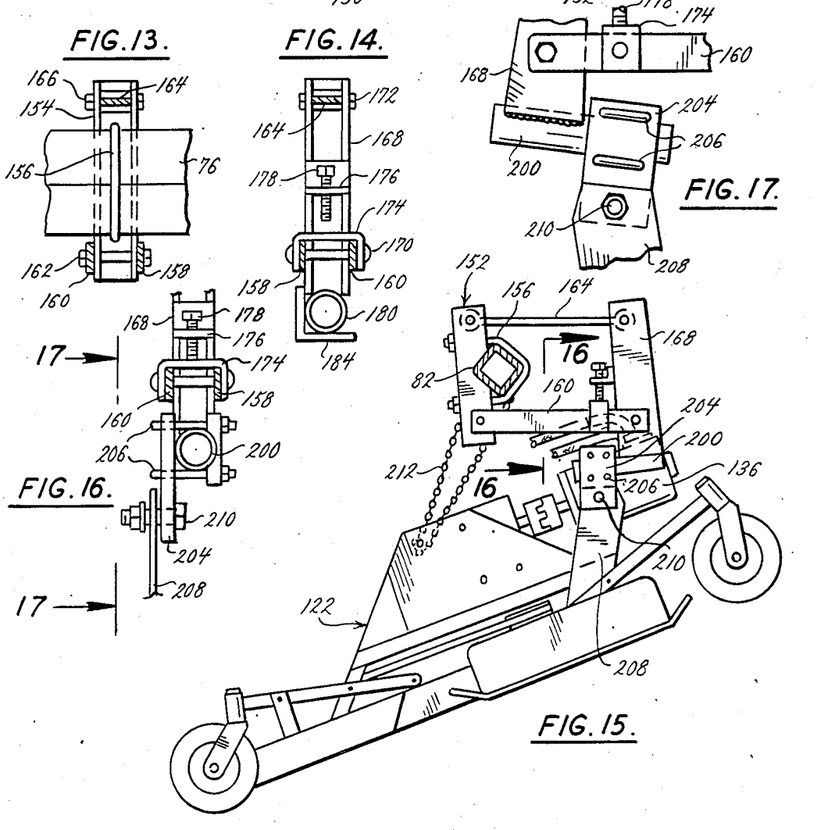
FIG. 13 is an enlarged view in section taken along the plane of the line 13—13 of FIG. 12.
FIG. 14 is an enlarged view in section taken along the plane of the line 14—14 of FIG. 12.
FIG. 15 is a side elevation view taken along the line 15—15 of FIG. 18, but showing the tool bar elevated to elevate the mower units.
FIG. 16 is an enlarged view in section taken along the plane of the line 16—16 of FIG. 15.
FIG. 17 is a side elevation view as viewed along the plane of the line 17—17 of FIG. 16.

Just to the rear of the channel member168, a strap 174 is welded or bolted to the plates 158 and 160. Above the strap 174, an angle member 176 is welded to the channel member 168. A set screw 178 is threaded through the angle member 176. The set screw 178 can be threaded to select an adjustment within the angle member 176 and engage the strap 174 to act as a stop limiting the downward pivotal movement of the channel member 168 relative to the channel member 154. This action of the set screw 178 against the strap 174 occurs when the tool bars 76, 80 and 82 are raised and is illustrated in FIGS. 15 and 16.

Since the mower units 120 and 124 are staggered forward of the other mower units 122 and 126, there are differences in the mounting means. For each of the two forwardly mounted mower units 120 and 124, there are a pair of pipes 180 and 182 welded to the bottom of the channel members 168 and extending forwardly thereof. Angle members 184 and 186 are welded to the pipes 180 and 182. A suitable reinforcing plate 188 may be welded between the channel member 168 and each of the angle members 184 and 186, as shown in FIG. 1, and broken away in FIG. 12.

Figure 12:
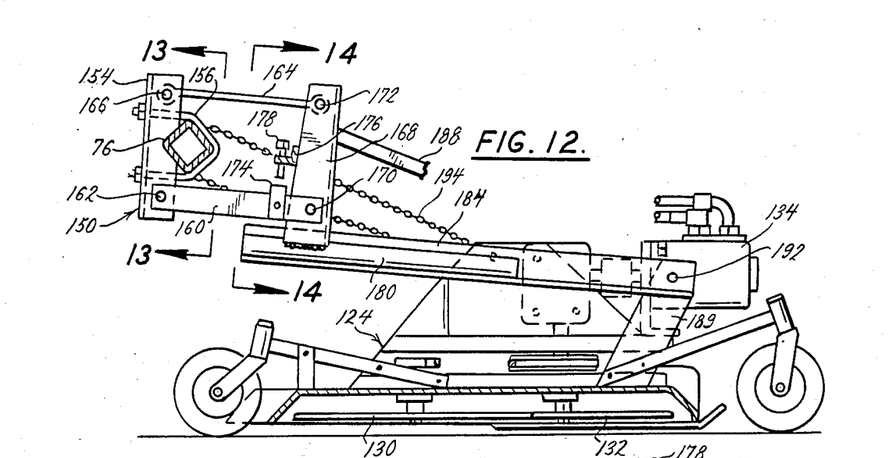
FIG. 12 is a view in section taken along the plane of the line 12—12 of FIG. 8.

Each mower unit 120 and 124 has a pair of upwardly extending plates 188 and 190 pivotally fastended by suitable pins or bolts 192 to the respective angle members 184 and 186. Thus, because of the pivotal mounts 192 and the pivotal connections of the channel member 168 of the parallelogram bracket assemblies 150, the mower units 120 and 124 are free floating when they are in the down position, as shown in FIG. 12.

A chain 194 is connected between the tool bar section 76, or section 80 as appropriate, and the mower unit 124, or 120, to prevent the mower units 120 and 124 from pivoting too far about the pivot mounts 192 when the entire mower assembly is raised.

The rearwardly positioned mower units 122 and 126 are each mounted on a pair of short pipe stubs 200 and 202 that are welded to the bottoms of the channel members 168 associated with the parallelogram bracket assemblies 150 and 152 of the mower units 122 and 126. A plate 204 is connected to each pipe stub 200 and 202 by suitable means such as a pair of U-bolts 206, as particularly shown in FIG. 16. A pair of plates 208 extending upwardly from the mower units 122 and 126 are pivotally connected to the plates 204 by suitable pins or bolts 210.

There is a chain 212 connected between the tool bar 76 or the tool bar 82 and the respective mower unit 122 and 126 to prevent the mower units 122 and 126 from pivoting too far when the entire assembly is elevated, as illustrated in FIG. 15.

Figure 2:
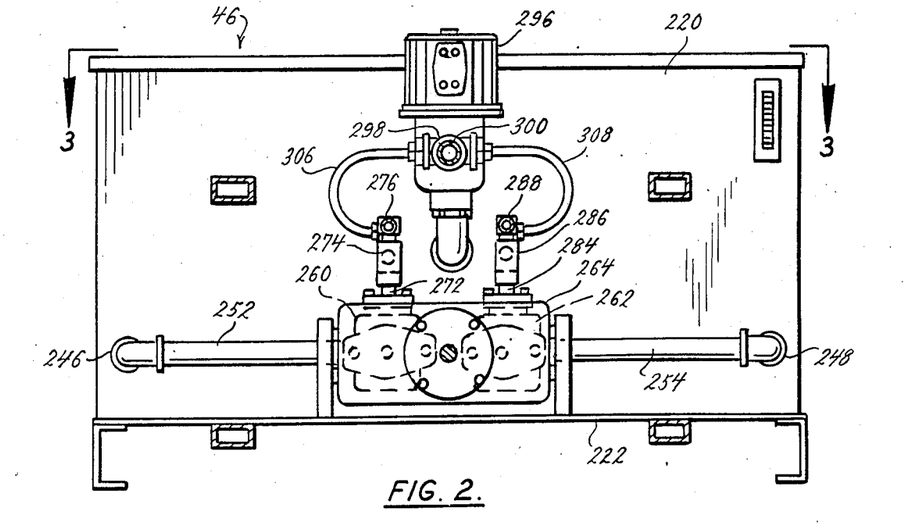
FIG. 2 is an enlarged front elevation view of the oil reservoir and power assembly as viewed along the plane of the line 2—2 of FIG. 1.
Figure 3:
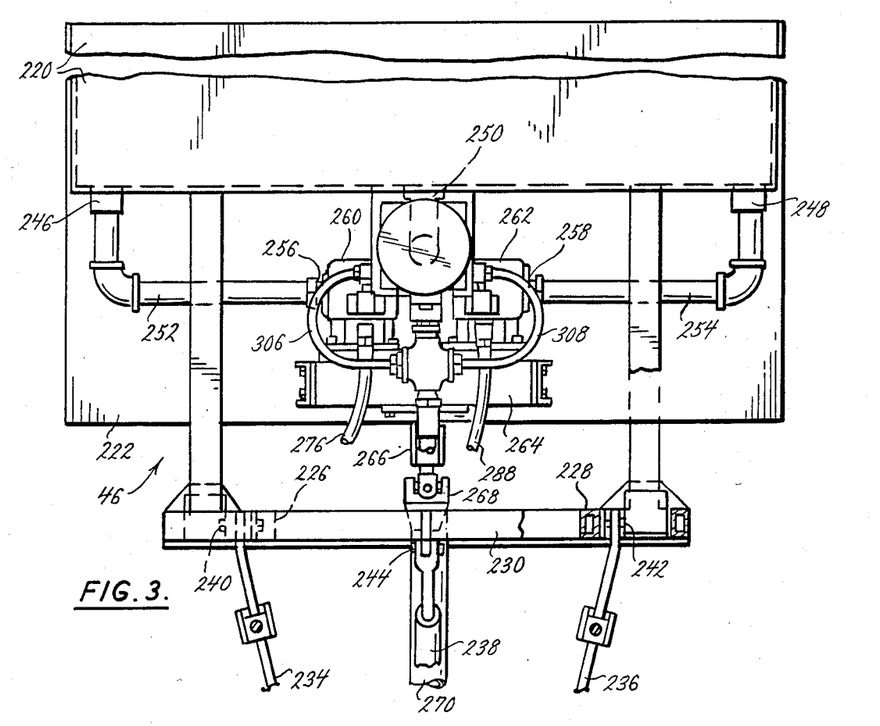
FIG. 3 is a top plan view of the oil reservoir and power assembly as viewed along the plane of the line 3—3 of FIG. 2.
Figures 4, 24, 25:
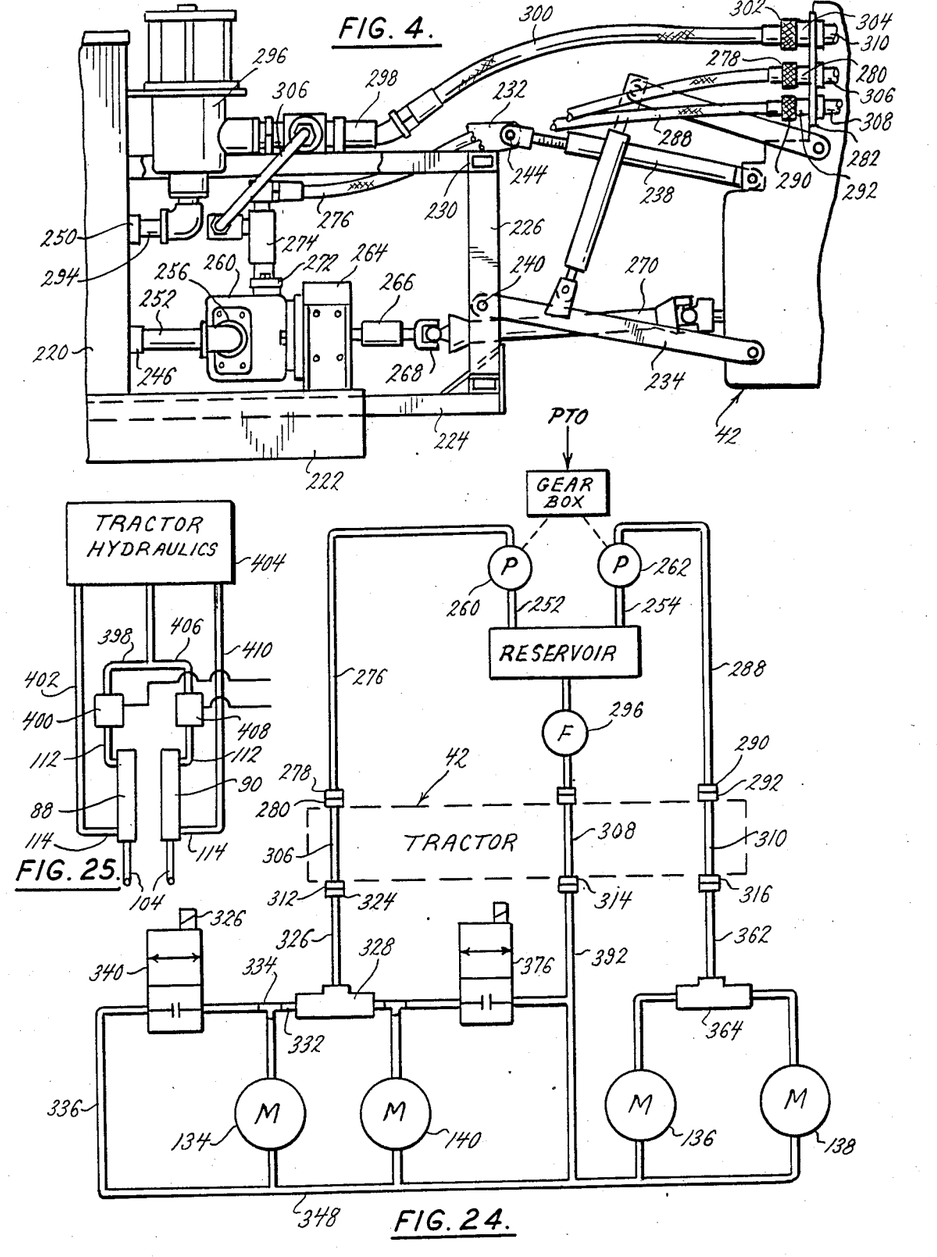
FIG. 4 is an enlarged side elevation view of that portion of FIG. 1 encompassing the oil reservoir support frame and the pump and hose system.
FIG. 24 is a schematic piping diagram of the fluid system and its controls, incorporating a modified and preferred fluid system.
FIG. 25 is a schematic diagram of the piping for the hydraulic system of the tractor.

The hydraulic reservoir and power assembly 46 that is mounted to the rear of the tractor 42 is particularly shown in FIGS. 2, 3 and 4. This assembly 46 includes a hydraulic oil tank 220, preferably having a capacity of about 200 gallons. The tank 200 is mounted upon a platform frame 222. There are additional frame members welded together and welded to the tank 220 and to the platform frame 222, including a pair of vertical columns 226 and 228 (see FIG. 3) and an upper horizontal member 230.

A small plate 232 is welded to and extends upwardly from the center of the horizontal frame member 230. At the rear of the tractor 42, there is a conventional three-point hitch including two lower hitch arms 234 and 236 and an upper hitch arm 238. The lower hitch arms 234 and 236 are connected to the vertical frame members 226 and 228 by removable pins 240 and 242, and the upper hitch arm 238 is connected to the short vertical plate 232 by another removable pin 244. As is known, the hitch consisting of the lower arms 234 and 236 and the upper arm 238 can be raised and lowered from inside the cab 48 of the tractor.

The oil reservoir 220 is provided with two suction outlet ports 246 and 248 near the bottom of its front wall. The suction outlet ports 246 and 248 are spaced apart to allow for easy plumbing. Above the suction outlet ports 246 and 248, the reservoir 220 has a fluid return inlet port 250, spaced from the ports 246 and 248 to defeat turbulence.

The suction ports 246 and 248 are connected by pipes 252 and 254 to the suction inlets 256 and 258, respectively, of two pumps 260 and 262. The pumps 260 and 262 are driven by a double pump drive gear box 264 having a single independent input 266 having a connector 268 by which it is releasably connected to a power takeoff shaft 270 leading from the power takeoff of the tractor 42. The gear drive box 264 has a gear ratio, preferably about 1.36 to 1 increase, selected to cooperate with the high speed of the power takeoff, about 1000 rpm, to drive the pumps. High speed is needed to pump the hydraulic oil, and a pump speed of at least 1200 rpm is desirable.

The discharge outlet 272 from the pump 260 is connected to a pressure relief valve 274. A hose 276 is connected from the pressure relief valve 274, and the hose 276 has a quick disconnect coupling 278 on its end that connects to a complementary fitting 280 mounted in a bracket 282 on the tractor. The discharge outlet port 284 from the other pump 262 also is connected to a pressure relief valve 286 which in turn is connected by a hose 288 to a quick disconnect coupling 29 that also has a complementary fitting 292 mounted in the bracket 282.

The return port 250 to the reservoir 220 is connected by a pipe 294 to the outlet from a hydraulic fluid filter 296. A pipe 298 leads to the inlet to the filter and a hose 300 is connected between the pipe 298 and a quick disconnect coupling 302 having a complementary fitting 304 mounted in the bracket 282 that is fixed to the tractor 42. All of the quick disconnect douplings and complementary fittings have valves that close upon disconnect and reopen upon reconnect. These quick disconnect couplings may be like the H series couplings sold by Snap-Tite, Inc. of Union City, Pa.

As can be seen in FIGS. 2, 3 and 4, there are hoses 306 and 308 from the pressure relief valves 274 and 286, respectively, connected to the pipt 298 upstream of the hydraulic filter 296. From the quick disconnect fittings 280, 292 and 304, there are hoses 306, 308 and 310 extending along and mounted to the side of the tractor 42, terminating in quick disconnect couplings 312, 314 and 316 that are mounted in a bracket 318 connected to the front of the tractor 42.

A quick disconnect coupling 234 is connected to the fitting 314, and a hose 326 leads from the coupling 234 to a flow divider 328. The flow divider is of the kind that is a pressure compensated fixed flow control which divides the input flow proportionately into two output flows. It is also the kind that does not require a constant flow rate or pressure to function, and calibrated proportioned flow will be maintained regardless of inlet flow or actuator load. The flow divider 328 allows the fluid supplied by the hose 326 to be divided into two separate circuits.

One of the outlets from the flow divider 328 is connected by a hose 330 to the hydraulic motor 136 of the inboard mower 124. The other outlet from the flow divider 328 is connected by a short conduit 332 to a Tee 334. One outlet from the Tee 334 is connected by a hose 336 to the hydraulic motor 140 of the outboard mower 126. The other outlet from the Tee 334 is connected by a short conduit 338 to a dump valve 340. The dump valve 340 is electrically operated by way of a wire 342 (that can be unplugged or otherwise disconnected) leading from the cab 48 of the tractor 42. The dump valve 340 is normally closed, but when actuated, opens for communication from the short conduit 332 to a hose 344.

The hose 344 is connected by a fitting 346 to a large fluid return pipe 348 that is mounted to the central tool bar section 76. The outlet side from the hydraulic motor 138 is also connected by a hose 350 to a fitting 352 connected to the large return pipe 348. Likewise, the outlet side from the outboard hydraulic motor 140 is connected by a hose 354 to a fitting 356 that is connected to the large return pipe 348.

returning to the bracket 318 on the front of the tractor 42, another quick disconnect coupling 360 complementary with the fitting 314 is connected to the end of a hose 362 that leads to another flow divider 364 identical to the flow divider 328. One outlet from the flow divider 364 is connected by a hose 366 to the hydraulic motor 136 of the inboard mower unit 122. The other outlet from the flow divider 364 is connected by a short conduit 368 to a Tee 370. One side of the Tee 370 leads directly by way of a hose 372 to the hydraulic motor 134 of the outboard mower unit 120. The other side of the Tee 370 is connected by a short conduit 374 to a dump valve 376 that is identical to the dump valve 340. The dump valve 376 is connected by an unpluggable electric cord 378 to the cab 48 of the tractor 42 for operation therefrom.

The valve 376 is normally closed, but when actuated, will open to provide a connection to an outlet conduit 380 that leads to a fitting 382 connected to the large return pipe 348. Similarly, a hose 384 leads from the hydraulic motor 136 to a fitting 386 connected to the large return pipe 348, and a hose 388 leads from the hydraulic motor 134 to a fitting 390 connected to the large return pipe 348.

There is a Tee 390 in the return pipe 348. A hose 392 leads from the Tee 390 and has a quick disconnect coupling 394 at its end complementary to the quick disconnect fitting 316 mounted in the bracket 318 and connected to the end of the hose 310.

FIG. 24 illustrates a schematic flow diagram for the hydraulic system that has been previously described. However, the circuit of FIG. 24 is modified in that both dump valves 340 and 376 are operated from a common pump 260.

Figure 7:
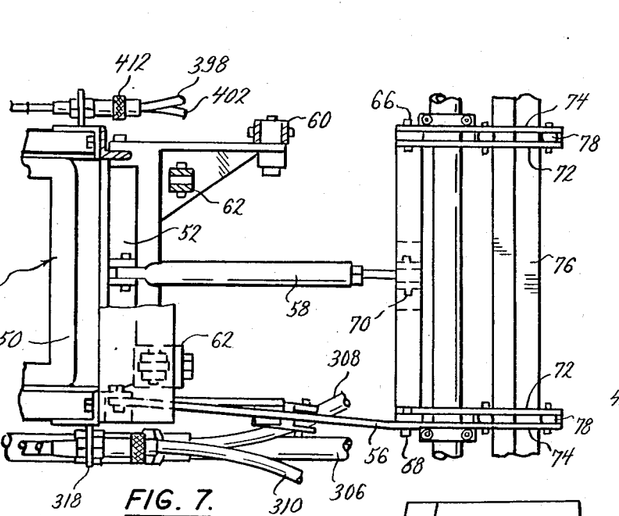
FIG. 7 is a bottom view of a portion of the attachment generally as viewed along the plane of the line 7—7 of FIG. 6.

FIG. 25 illustrates diagrammatically the hydraulic system to operate the piston and cylinder assemblies 88 and 90. A hydraulic supply conduit 398 leads through an electrically controlled valve 400 to the fluid inlet line 112 to the piston and cylinder assembly 88, and a return conduit 402 leads to the tractor hydraulic supply 404 from the fluid outlet line 114 of the piston and cylinder assembly 88. Similarly, a conduit 406 leads through an electrically operated valve 408 to the inlet fluid line 112 to the piston and cylinder assembly 90, and a return conduit 410 leads back to the hydraulic supply 404 from the cylinder outlet line 114. There are quick disconnect couplings in all these hydraulic conduits 398, 402, 406, and 410, as represented by the quick disconnect couplings 412 mounted to the left side of the tractor (see FIG. 7). When the switch 400 is actuated, the piston and cylinder assembly 88 will operate. When the switch 408 is actuated, the cylinder-piston 90 will operate. These switches 400 and 408 are controlled from inside the cab 48 of the tractor 42.

OPERATION AND USE

The operation and use of this invention is easy and yet the mower can mow a large area in a short period of time. Attaching the mower assembly to the tractor involves only the connections of the three point hitches and the quick disconnect couplings, together with connecting the electric control wires to the dump valves. For the mower assembly 44, the three point hitch connections involve the installation of the three pins 66, 68 and 70, the connecting of the three quick disconnect couplings 324, 360 and 394 (and the couplings represented by the couplings 412), and connecting the electric cords 342 and 372 leading to the dump valves 340 and 376.

To connect the oil reservoir and power assembly 46, the three pins 240, 242 and 244 are connected and the power takeoff connection 268 is connected. The quick disconnect couplings 278, 290 and 302 are connected. Thereafter, the tractor mower assembly can be operated. To remove the mower assembly, the steps are reversed and the disconnections made quickly. When the mower assembly 44 is disconnected, the tractor should be driven from it, after which the hydraulic reservoir and power assembly 46 can be quickly disconnected. Thereafter, the tractor can be driven away from the hydraulic reservoir and power assembly 46 to be used for other farm purposes.

In operation, all four of the mowers are in the down position, and the system will mow paths of about twenty-four foot widths. Because the steering is front-wheel steering, the tractor will turn sharply. All of the mowing is in full view of the operator within the cab 48 of the tractor 42. When he sees an obstacle, he can actuate the appropriate valve 400 or 408 to raise one or the other (or both) of the outboard tool bars to raise the outboard mower units, as shown in dotted lines in FIG. 18.

There are various changes and modifications which may be made to this invention as would be apparent to those skilled in the art. However, any of these changes or modifications are included in the teaching of this disclosure and this invention is limited only by the scope of the claims appended hereto.

What we claim is:

1. A tractor mower assembly for attachment and detachment to and from a general-purpose tractor of the kind having an operator's station, a vertically movable three-point hitch at the front of the tractor, a hydraulic system having a control at the operator's station for moving the hitch vertically relative to the tractor, a hitch at the rear of the tractor, and a power takeoff at the rear of the tractor, comprising a tool bar having a central section the central section having opposite ends and having two outboard sections, and a frame supporting the central section and having three connection points with connecting means for connection to the three-point hitch at the front of the tractor, a pair of central brackets connected to the ends of the central section, a pair of outboard bracket connected to the respective outboard sections, means for pivotally connecting the central brackets to the outboard brackets, respectively, to enable swinging movement of the outboard sections relative to the central section, hydraulic piston and cylinder assemblies connected between the central section and the respective outboard sections for selective swinging of each outboard section relative to the central section, hydraulic fluid conduit tubes having quick disconnect connectors for connecting the piston and cylinder assemblies to said hydraulic system to enable selective operation of the piston and cylinder assemblies from the operator's station, at least four mower units, each having three rotary blades and a hydraulic motor for rotating the blades, first and second means for pivotally suspending two of the mower units from the central section, third and fourth means for pivotally suspending two mower units from the respective outboard sections, each of the first and third suspending means including two arms connected to and projecting forward of the tool bar, each of the second and fourth suspending means including two arms connected to and projecting rearward of the tool bar, two of the mower units being pivotally connected to the forward projecting arms and two of the mower units being pivotally connected to the rearward projecting arms whereby the first two mowers are forward of the second two mowers enabling the sides of adjacent mowers to overlap without interference and avoid unmowed rows between them, means connected between the tool bar and each mower for limiting the angle of pivotal movement of the mower unit relative to the tool bar when the tool bar is raised, a hydraulic fluid reservoir and pump means, a support frame for supporting the hydraulic fluid reservoir and pump means, means for releasably connecting the support frame to the hitch at the rear of the tractor, means for releasably connecting the pump means to the power takeoff for operation of the pump means by the power takeoff, hydraulic fluid conduit tubes supported by the tractor and having front ends adjacent the front of the tractor and rear ends adjacent the rear of the tractor, front hydraulic fluid conduits for conveying hydraulic fluid through the mower motors, quick disconnect connectors for releasably connecting the front hydraulic fluid conduits to the front ends of the hydraulic fluid conduit tubes, rear hydraulic fluid conduits for circulating hydraulic fluid through the reservoir and pump means, and quick disconnect connectors for releasably connecting the rear hydraulic fluid conduits to the rear ends of the hydaulic fluid conduit tubes, whereby the central section supporting frame and the front hydraulic fluid conduits can be readily and quickly connected and disconnected from the front of the tractor and hydraulic fluid conduit tubes, and the reservoir and pump means support frame and the rear hydraulic fluid conduit means can be readily and quickly connected and disconnected from the tractor, the hydraulic fluid conduit tubes, and the power takeoff.

2. The tractor mower assembly of claim 1 wherein the pump means comprises two pumps, one of which circulates hydraulic fluid through the motors of the mowers supported from the central section and the other of which circulates hydraulic fluid through the motors of the mowers supported from the outboard sections, and dump valves in the front fluid conduit selectively operable to cause hydraulic fluid to bypass either of the motors of the mowers supported from the outboard sections, whereby the outboard sections can be selectively swung upwardly and the blades of the mowers supported by them can be selectively stopped while the blades of the other mowers continue to rotate.

3. The tractor mower assembly of claim 1 wherein the means for limiting the angle of pivotal movement of the mower units relative to the tool bar comprises a chain connected between each mower unit and the tool bar.

4. The tractor mower assembly of claim 1 wherein the central and outboard brackets comprise interfitted channel members, and stops for limiting the extent of relative pivotal movement of the brackets to thereby limit the extent of swinging movement of the outboard sections relative to the central section, each stop comprising edges defined by one channel member in the path of relative movement of a wall defined by the other channel member.

5. The tractor mower assembly of claim 1 wherein each quick disconnect connector incorporates valve means automatically closeable upon disconnecting the connector and automatically openable upon connecting the connector.

6. The tractor mower assembly of claim 1 wherein the reservoir has a top and a bottom, the pump means comprises two pumps, the rear hydraulic fluid conduits including two outlets from the reservoir connected to the suction sides of the pumps and including a return opening to the reservoir and connected to the mower motors, the outlets being spaced from the return opening to minimize turbulence.

7. The tractor mower assembly of claim 6 wherein the outlets are spaced from one another and are located near the bottom of the reservoir and the return opening is located toward the top of the reservoir.

8. The tractor mower assembly of claim 1 including means connected between each arm and the tool bar and defining a generally parallelogram configuration having four pivotally connected sides, and manually adjustable stop means to limit the pivotal movement of each parallelogram.

* * * * *